3,823,224
PRODUCTION OF A CHAR REINFORCING AGENT FROM PYROLYZED SCRAP-RUBBER

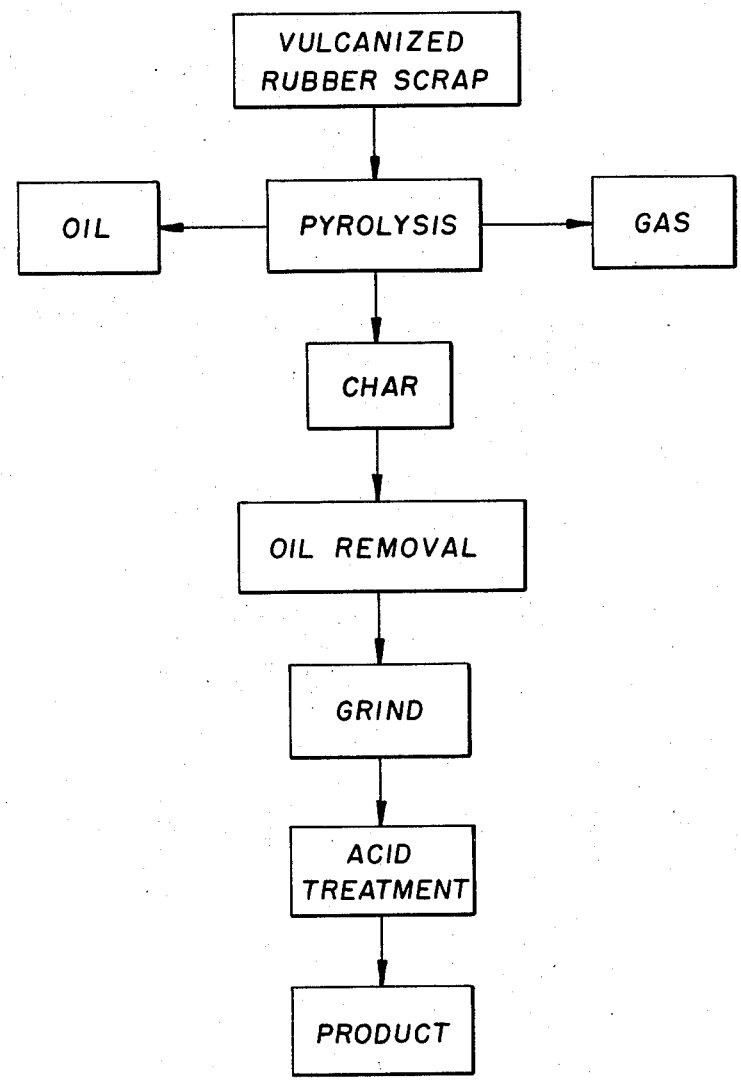

Joseph R. Laman and Edward Leo Kay, Akron, Ohio, assignors to The Firestone Tire & Rubber Company, Akron, Ohio
Filed Mar. 20, 1972, Ser. No. 236,288
Int. Cl. C01b 31/08
U.S. Cl. 423—449      3 Claims

ABSTRACT OF THE DISCLOSURE

The invention relates to a rubber reinforcing agent derived from vulcanized scrap rubber. The scrap rubber is charred, treated for removal of oil, ground and then treated with acid to remove metal compounds. The product has been found to be a very satisfactory rubber-reinforcing agent.

---

The invention relates to producing a rubber-reinforcing agent from vulcanized scrap rubber. It includes the process and the product.

The composition of vulcanized scrap rubber varies quite widely, being obtained from tires optionally with a percentage of rubber from other sources. The rubber scrap includes rubbers of different compositions, and usually rubbers made from different elastomers. The different rubbers contain different metal compounds. Most rubbers contain zinc oxide. The rubber obtained from tire treads usually contains other compounding ingredients in rather substantial amounts, which compounding ingredients are largely absent from the remainder of the tire. On the other hand, tire sidewalls usually contain titanium dioxide to produce a product of attractive color. This pigment is absent from tire treads. Thus, the scrap varies not only in the elastomer content but in the mineral content, etc.

In the production of the reinforcing agent of this invention, the scrap rubber is charred by heating in the substantial absence of air at a temperature of 1000 to 2500° F., and preferably at a temperature of about 1200 to 1800° F. Different types of pyrolyzing equipment may be utilized. A Bartlett-Snow calciner has given satisfactory results.

Most scrap rubber contains at least a certain portion of oil used in the compounding of at least some of the rubbers which make up the scrap. Other oil is derived from decomposition of rubber polymers which are present. Some of this total oil content is volatilized during the pyrolyzation, but some remains, and it has been found that the oil which remains slows or prevents the vulcanization reaction. Therefore, at least most of the oil is removed. The product should contain no more than 5 parts by weight of the heavy oil produced by pyrolysis, per 100 parts of char.

As disclosed, the grinding and oil removal may be carried out in one step.

The drawing by a flow sheet illustrates the procedure.

There are many procedures which may be employed for reducing the oil content; such, for example, as recalcination at the same or higher temperature, extraction with organic solvents such as benzene, acetone, etc., and any one of a variety of procedures may be utilized.

After reducing the oil content, the char is reduced to a fine particle size such as particles 50 percent by weight of which are fine enough to pass through a screen of 325 mesh. For certain reinforcing applications, as in some tires, a smaller particle size in which 90 percent passes through such a screen, may be required. Any suitable type of grinding equipment may be employed such as a hammer mill or fluid-energy mill. The oil removal may be additionally effected during the grinding operation as by using a fluid-energy mill with steam as the motive fluid.

The char after being ground to expose fresh surfaces is treated with acid—usually a mineral acid and preferably an inexpensive acid such as sulfuric acid or hydrochloric acid—to remove metal compounds which may be present as oxides, sulfides, etc. and appear as ash. Ash is defined as the non-volatile residue obtained by analytically burning the char. Such metal compounds are derived from the accelerator, antioxidant, pigments and other compounding ingredients used in preparing the rubber originally for vulcanization. Such metal compounds usually include zinc oxide, and often titanium dioxide. The acid solubilizes at least some of the metal compounds and they are removed as by subsequent filtration of the treating bath. The resulting product generally has an analysis such as the following:

In a typical procedure the ground char obtained by pyrolyzing the scrap rubber in the substantial absence of air, before acid extraction of the ash, has the following analysis:

| | Weight percent |
|---|---|
| Zinc | 2.9 |
| Magnesium | 0.10 |
| Calcium | 0.04 |
| Aluminum | 0.44 |
| Titanium | 0.45 |
| Silicon | 0.69 |

After treatment with sulfuric acid the analysis of the char was:

| | Weight percent |
|---|---|
| Zinc | 1.4 |
| Magnesium | 0.03 |
| Calcium | 0.03 |
| Aluminum | 0.07 |
| Titanium | 0.09 |
| Silicon | 0.66 |

These analytical data indicate a significant reduction in the amounts of the metal compounds originally present in the char. Non-metal compounds such as silicon are not removed by the acid treatment. Approximately the same results would be obtained by using another mineral acid such as hydrochloric, etc.

The acid treatment of the ground char results in the production of valuable chemical compounds. For example, if sulfuric or hydrochloric acid is used, the zinc oxide, sulfide, etc. present in the char will be converted to zinc sulfate or chloride which may be recovered as any suitable zinc compound for recycling in industry.

This char product which is substantially free from oil and metal compounds has been used satisfactorily as a reinforcing agent in the compounding of elastomers such as natural rubber, synthetic polyisoprene, butadiene-styrene copolymer, polybutadiene, butyl rubber, neoprene, ethylene-propylene copolymer (with or without diene), etc., in the manner in which carbon black has previously been used. The waste vulcanized scrap rubber may thus be utilized to reduce the wasteful carbonation of valuable fuels which is now going on on a large scale, for the production of carbon blacks which are used for rubber-reinforcing agents.

The removal of residual acid is important because the presence of acid in the reinforcing agent may retard vulcanization. The last of the acid is usually removed by washing which can take place in any suitable equipment and usually water alone will be employed. Bases such as sodium hydroxide, ammonium hydroxide, calcium hydroxide, organic amines, etc., may be added to neutralize acid which remains on the char particles.

Any base may be used with the general restriction that the salt which the base forms with the residual acid must not adversely affect the vulcanization reaction when the acid-treated ground char is used as a reinforcing agent in rubber. Furthermore, the amount of residual acid should be kept at a minimum so that subsequent formation of the salt formed by neutralization with base will not significantly increase the ash-content of the char. Such neutralization will usually be carried out as a final step of the washing procedure.

The acid-treated ground char may be used as such in the reinforcement of rubbers, but usually it will be pelletized as is customary in the treatment of carbon black for the production of reinforcing materials.

The ground char obtained may be used as a filler or a reinforcing agent in mechanical goods such as belts, pads or by proper handling as a general purpose reinforcing black to replace SRF (semi-reinforcing furnace) black and GPF (general purpose furnace) black which are generally used in the carcasses of tires.

The general procedure for treating char produced by pyrolyzing scrap rubber at 1200 to 1800° F. in the substantial absence of air, follows; however, it should be noted that many variations of procedure may be utilized and found effective and the claims are not limited to the examples summarized in what follows. The process may be carried out as a batch or continuous operation using concurrent or countercurrent operation relative to char and oil/gas flows.

The general procedure is to charge the ground char to a vessel provided with good means of agitation. The acid used is usually dilute, such as a 10 wt. percent acid solution in water but concentrations from 1 wt. percent to 25 wt. percent or thereabouts can be used. A wetting agent such as methanol, soap etc. may optionally be added to effect better contact of the char with the acid solution. The concentration of the wetting agent may vary from zero to 10 wt. percent of the acid solution. The char/acid slurry is optionally heated to the boiling point or higher if a pressure reactor is used. The time of agitation may vary from 10 minutes to 24 hours depending upon the conditions of the treatment and how much ash is to be removed from the ground char. After the acid-treatment, the slurry is filtered and the acid solution may optionally be recycled to treat additional ground char. Optionally the acid solution from the filtration operation may be reconstituted to the original strength and recycled to treat additional ground char.

An alternative procedure which may be followed is to neutralize the acid solution to a pH at which $Zn(OH)_2$ and other metal hydroxides or oxides will precipitate from the solution. The solution is filtered and a precipitate which contains several valuable metal hydroxides or oxides is obtained. This may be treated by convention means to recover metal compounds which are recycled to manufacturing operations.

The ground char is then dried and optionally pelletized. The char may be used as a reinforcing agent as herein disclosed.

EXAMPLE 1

Scrap tires, which are generally representative of tires which can no longer be retreaded because of damaged bodies, were cut into approximately one-inch squares and calcined at 1200° F. The recovered char was ground in a fluid-energy mill using steam as the motive fluid. The steam removed oil during the pulverizing step. A model S 12–.28 Jet Pulverizer manufactured by Majac Inc., Pittsburgh, Pa. is a satisfactory grinding mill. The ground char was treated with boiling 10 wt. percent hydrochloric acid for approximately sixteen hours. The char slurry was cooled to ambient temperature and filtered. The char was then washed with water until the filtrate was essentially neutral.

The ground char so treated was dried and tested as a reinforcing agent for vulcanized rubber. It was experimentally determined that the ash-content before acid-treatment was 10.8 wt. percent and after acid-treatment, the ash-content was 3.6 wt. percent which represents a reduction of approximately 67 percent more generally the ash content is no greater than about 5 percent by weight.

For purposes of comparison, char which had been treated with acid was compared with char that had not been so treated. Both were used in the following recipe. All concentrations are expresed as phr. (parts per hundred of rubber).

|  | Phr. |
|---|---|
| SBR–1502 Type | 100 |
| Char | 40 |
| Oil | 1.7 |
| ZnO | 3.0 |
| Stearic acid | 1.0 |
| Accelerator [1] | 1.25 |
| Sulfur | 1.75 |

[1] Santocure NS, a product of Monsanto Co.

The scorch time for each product was tested in a Monsanto Rheometer. The time to optimum cure was significantly improved by acid treating the char. In addition, the modulus as well as the tensile strength of the "acid-treated char" vulcanizate were higher than for the untreated char.

The utility of the acid-treated ground char was shown by direct comparison of the physical properties of vulcanizate prepared from the same recipe but prepared with a commercial GPF (general purpose furnace) carbon black. The cure rates and both the moduli and tensile strengths after 15, 23 and 30 minutes curing were equivalent to or slightly superior to the GPF vulcanizate. The data leading to these conclusions are summarized in Table I.

TABLE I.—EVALUATION OF ASH-EXTRACTED CHAR

|  | Char without acid-treatment [1] | Acid-treated char [2] | Control GPF |
|---|---|---|---|
| Monsanto Rheometer 1° arc, 100 r.p.m., 300° F.: |  |  |  |
| Scorch time, minutes | 16.5 | 11.0 | 14.7 |
| Optimum (90%) cure, minutes | 36.3 | 32.7 | 36.8 |
| Normal stress-strain properties cured at 300° F.: |  |  |  |
| 300% modulus, p.s.i.: |  |  |  |
| 15' | 100 | 950 | 200 |
| 23' | 725 | 1,600 | 1,025 |
| 30' | 900 | 1,725 | 1,225 |
| Tensile strength, p.s.i.: |  |  |  |
| 15' | 125 | 3,000 | 1,050 |
| 23' | 3,000 |  | 2,575 |
| 30' | 2,500 | 2,850 | 2,775 |
| Ultimate elongation, percent: |  |  |  |
| 15' | 1,400 | 650 | 1,000 |
| 23' | 650 | 430 | 540 |
| 30' | 490 | 420 | 520 |

[1] 10.8 wt. percent ash.
[2] Treated with 10 wt. percent hydrochloric acid; 3.6 wt. percent ash.

EXAMPLE 2

Example 1 was repeated except the acids used during extraction of the ash from different batches of the char were acetic acid, 10 wt. percent nitric acid and 5 wt. percent sulfuric acid. Evaluation data is summarized in Table II. It will be noted that generally acetic acid is less effective in removing ash and that although nitric acid is effective in lowering the ash-content, the resulting char is a less effective reinforcing agent than the char prepared with hydrochloric or sulfuric acid. Comparison of the properties of vulcanizate containing sulfuric acid-treated char with the GPF vulcanizate in Table I also shows equivalent or slightly superior reinforcing properties for the sulfuric acid-treated char.

TABLE II.—CHAR TREATED WITH VARIOUS ACIDS

| | Char without acid treatment | Ground char treated with acid | | |
|---|---|---|---|---|
| | | Acetic | Sulfuric | Nitric |
| Ash-content, wt. percent | 10.8 | 8.5 | 3.7 | 3.5 |
| Monsanto Rheometer, 1° arc, 100 r.p.m., 300° F.: | | | | |
| Scorch time, minutes | 16.5 | 15.6 | 11.5 | 12.7 |
| Optimum (90%) cure, minutes | 36.3 | 34.9 | 28.2 | 38.8 |
| Normal stress-strain properties cured at 300° F.: | | | | |
| 300% modulus, p.s.i.: | | | | |
| 15' | 100 | 325 | 700 | 200 |
| 23' | 725 | 800 | 1,225 | 550 |
| 30' | 900 | 1,100 | 1,400 | 850 |
| Tensile strength, p.s.i.: | | | | |
| 15' | 125 | 1,875 | 2,675 | 675 |
| 23' | 3,000 | 2,550 | 3,075 | 2,775 |
| 30' | 2,500 | 2,450 | 2,825 | 3,100 |
| Ultimate elongation, percent: | | | | |
| 15' | 1,400 | 890 | 640 | 990 |
| 23' | 650 | 560 | 570 | 770 |
| 30' | 490 | 460 | 450 | 640 |

We claim:

1. A process of producing rubber-reinforcing agent which comprises pyrolyzing at 1000 to 2500° F. in the substantial absence of oxygen, vulcanized scrap rubber containing metal compounds removing substantially all the oil present after the pyrolysis and grinding so that the resulting char is of such a particle size that at least 50% will pass through a 325 mesh screen, and after grinding treating with aqueous mineral acid to reduce the ash content to no more than 5% by weight.

2. The process of claim 1 in which the acid used is hydrochloric acid.

3. The process of claim 1 in which the acid used is sulfuric acid.

References Cited

UNITED STATES PATENTS

| | | | |
|---|---|---|---|
| 3,644,131 | 2/1972 | Gotshall | 260—763 |
| 3,420,913 | 1/1969 | Railsback | 260—41.5 R |
| 2,008,145 | 7/1935 | Morrell | 252—425 |
| 3,018,288 | 1/1962 | Tokime et al. | 252—421 |
| 3,582,279 | 6/1971 | Beckman et al. | 252—421 |

DANIEL E. WYMAN, Primary Examiner

P. E. KONOPKA, Assistant Examiner

U.S. Cl. X.R.

106—307; 201—2.5, 25, 38; 252—421, 445; 260—41.5 R, 763; 423—445, 460, 461

UNITED STATES PATENT OFFICE
CERTIFICATE OF CORRECTION

Patent No. 3,823,224  Dated July 9, 1974

Inventor(s) Joseph R. Laman and Edward Leo Kay

It is certified that error appears in the above-identified patent and that said Letters Patent are hereby corrected as shown below:

In Column 4, Line 2, "percent more" should be --percent. More--.

In Column 4, Line 46, under the heading "Acid-treated char", "32.7" should be --28.7--.

In Column 5, Line 12, under the heading "Sulfuric", "28.2" should be --28.1--.

Signed and sealed this 29th day of October 1974.

(SEAL)
Attest:

McCOY M. GIBSON JR.
Attesting Officer

C. MARSHALL DANN
Commissioner of Patents